United States Patent [19]

Edson et al.

[11] Patent Number: 4,677,440
[45] Date of Patent: Jun. 30, 1987

[54] PASSIVE, FREQUENCY-STEERABLE, MICROWAVE REPEATER SYSTEM

[75] Inventors: William A. Edson, Los Altos Hills; Raymond A. Nelson, Palo Alto; Michael S. Frankel, San Jose, all of Calif.

[73] Assignee: SRI International, Menlo Park, Calif.

[21] Appl. No.: 476,129

[22] Filed: Mar. 17, 1983

[51] Int. Cl.$^4$ .................. G01S 13/02; H01Q 15/18
[52] U.S. Cl. ..................................... 342/157; 342/5; 342/367; 343/912
[58] Field of Search ............... 343/18 R, 18 B, 353, 343/912, 705, 915, 753, 367

[56] References Cited

U.S. PATENT DOCUMENTS

| | | | |
|---|---|---|---|
| 1,906,546 | 5/1933 | Darbord | 343/18 B |
| 2,968,033 | 1/1961 | Kreitzberg | 343/18 B |
| 3,144,606 | 8/1964 | Adams et al. | 455/12 |
| 3,427,623 | 2/1969 | Yater | 343/705 |
| 4,079,382 | 3/1978 | Henry | 343/753 |
| 4,342,033 | 7/1982 | de Camargo | 343/909 X |

OTHER PUBLICATIONS

Hecht and Zajac, Optics, pp. 357–358, Addison-Wesley Publishing Company, Reading, Mass., 1979.
The Optical Industry and Systems Directory-Encyclopedia, vol. II, 1976, The Optical Publishing Co., Inc., Pittsfield, Mass., 01201, p. E 37.
Jenkins and White, Fundamentals of Optics, McGraw-Hill, 1957, pp. 344–347.
Mallory et al, IEEE Transactions on Microwave Theory and Techniques, Sep. 1963, pp. 433 and 434.
Henry et al, "A Low-Loss Diffraction Grating Frequency Multiplexer", IEEE Transactions on Microwave Theory and Techniques, vol. Mtt-26, No. 6, Jun. 1978, pp. 428–433.

Primary Examiner—T. H. Tubbesing
Assistant Examiner—Mark Hellner
Attorney, Agent, or Firm—Victor R. Beckman

[57] ABSTRACT

Microwave communication and radar systems that employ a blazed microwave reflection grating are disclosed in which the grating comprises an array of electrical conducting scattering elements having plane parallel surfaces that face in the same direction. The plane parallel faces are positioned in parallel equally-spaced planes to provide a generally stair-step, or Venetian-blind type structure. Microwave energy beamed onto the plane parallel surfaces of the array exits at a diffraction-mode angle within the reradiation pattern of the individual scattering elements of the array. Frequency steering of the exit beam in one plane of the array is provided by varying the frequency of the illuminating beam.

15 Claims, 10 Drawing Figures

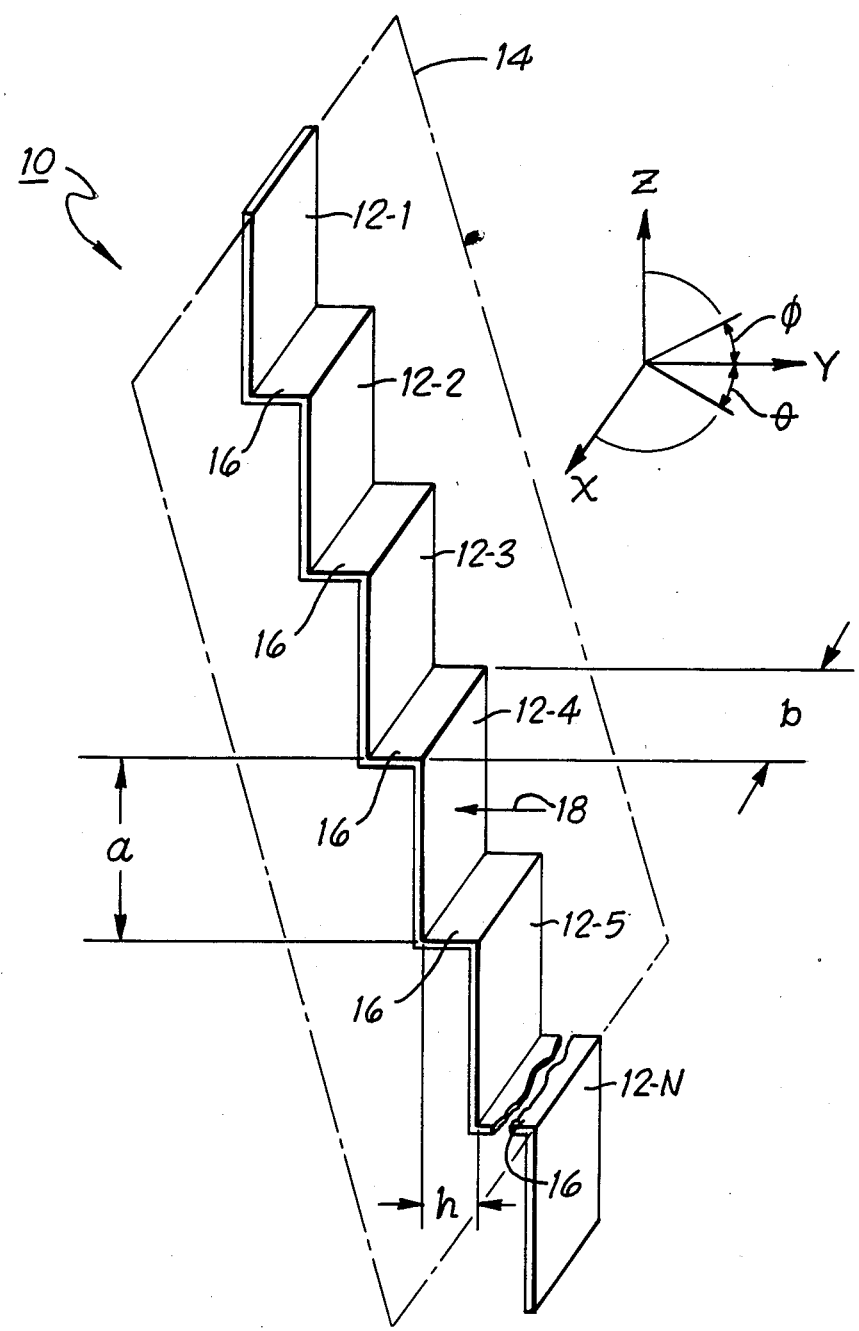
FIG_1

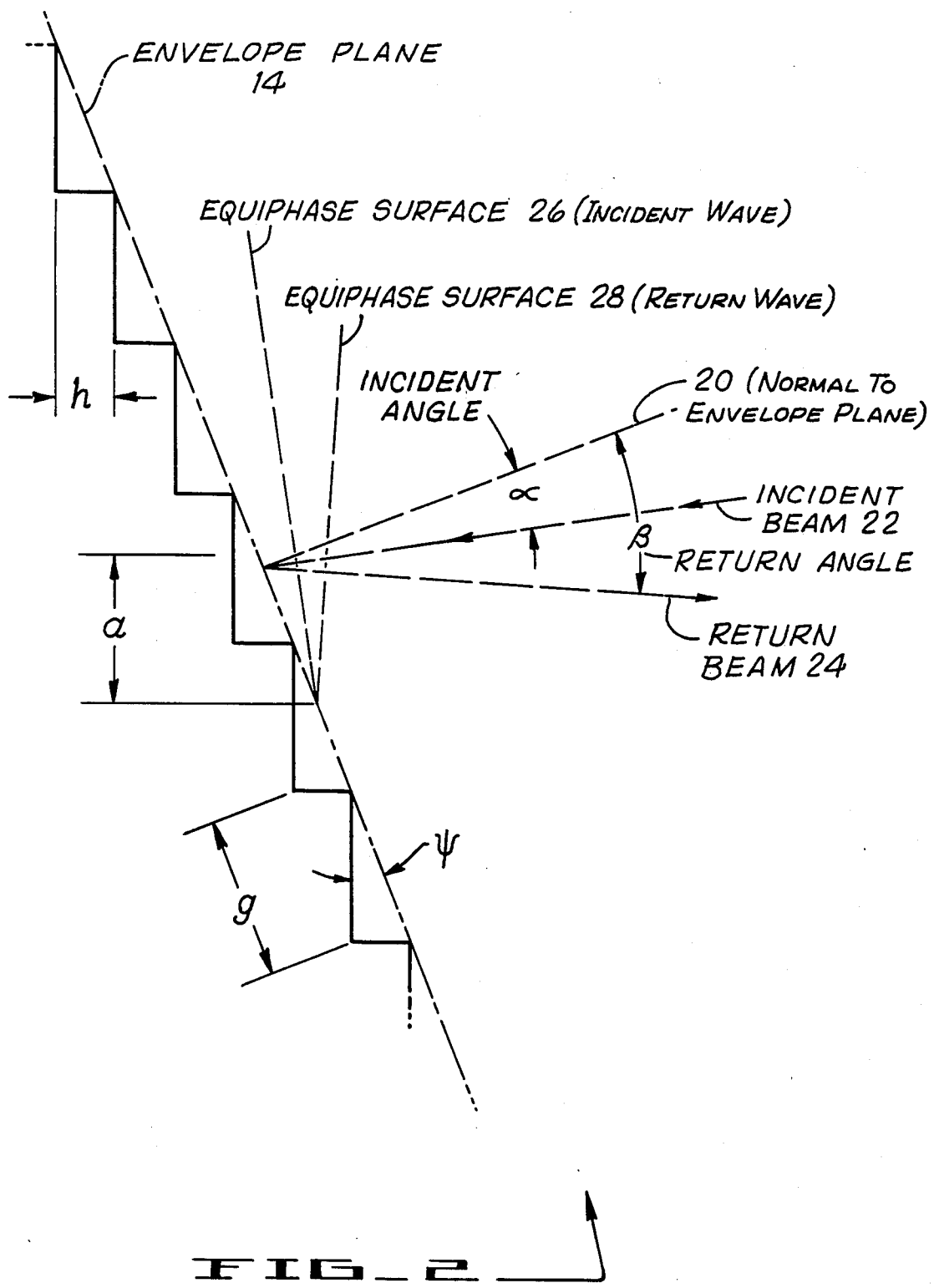
FIG_2

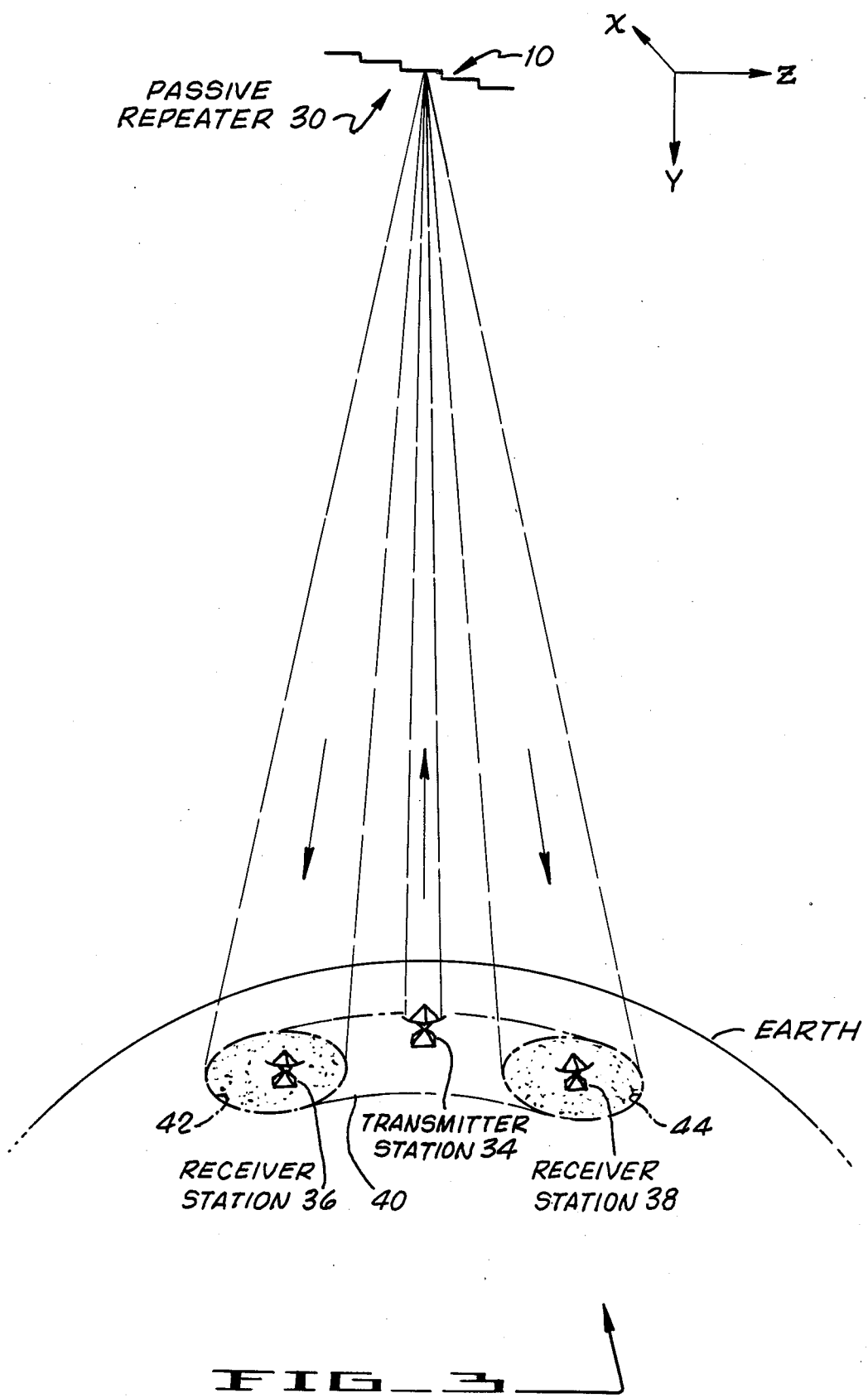
FIG_3

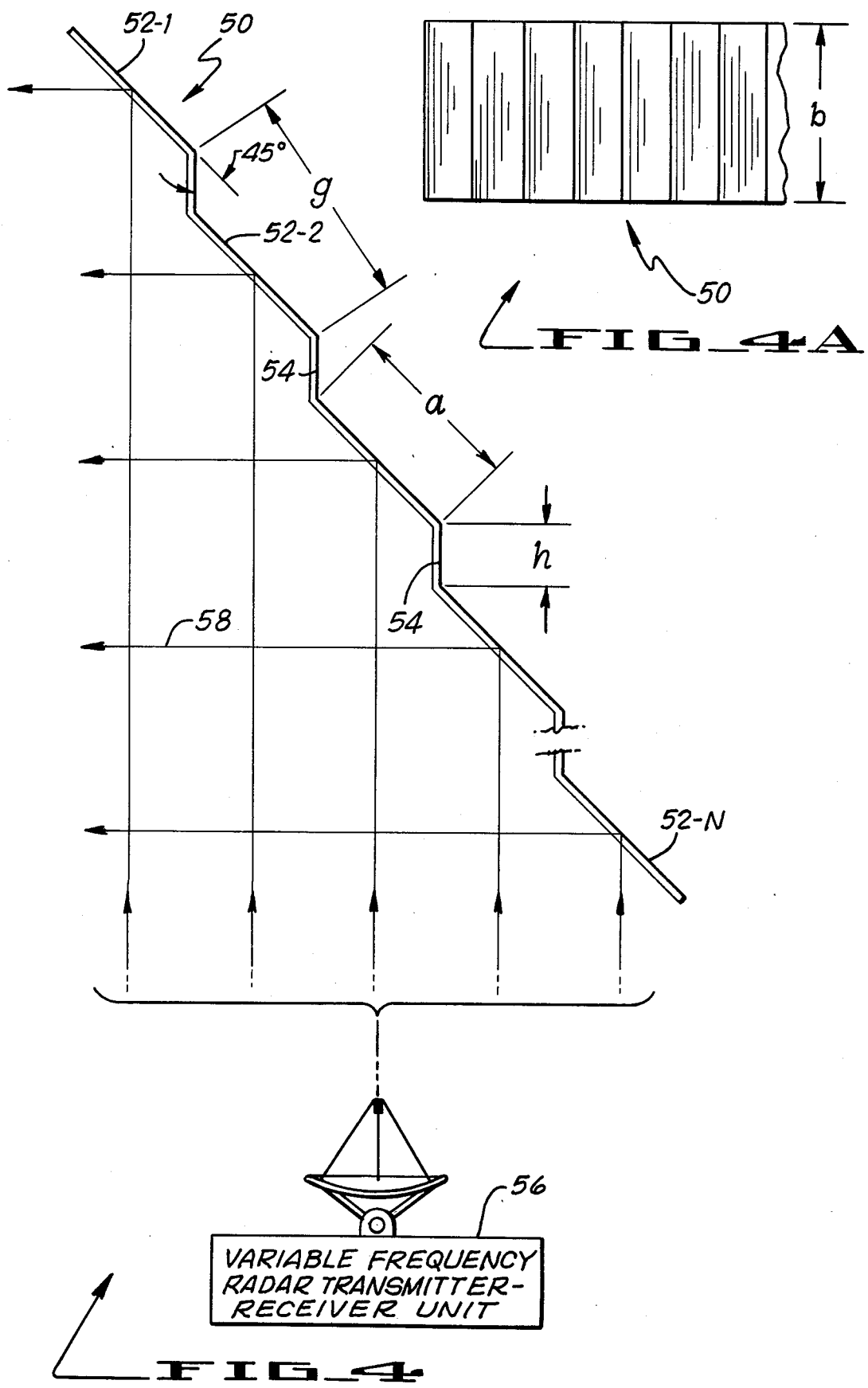

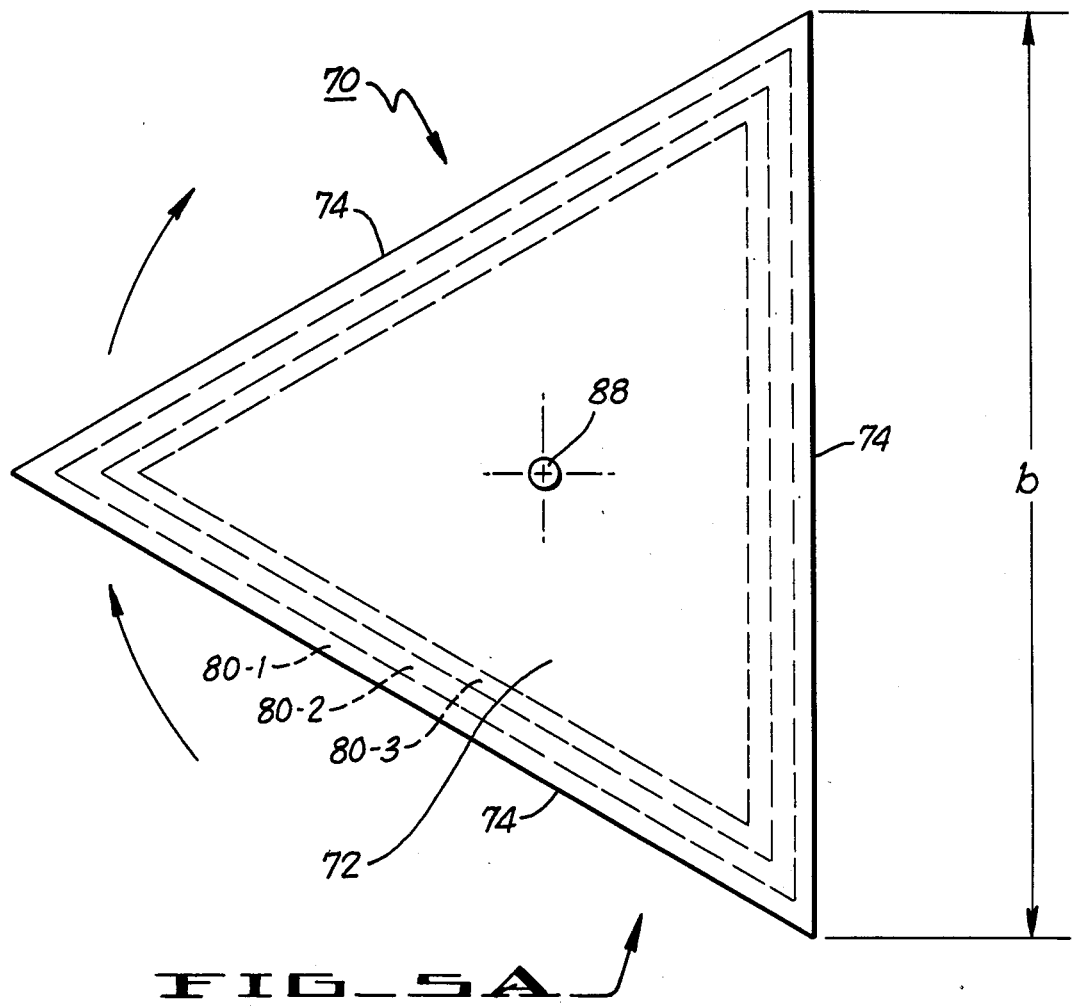
FIG_5A
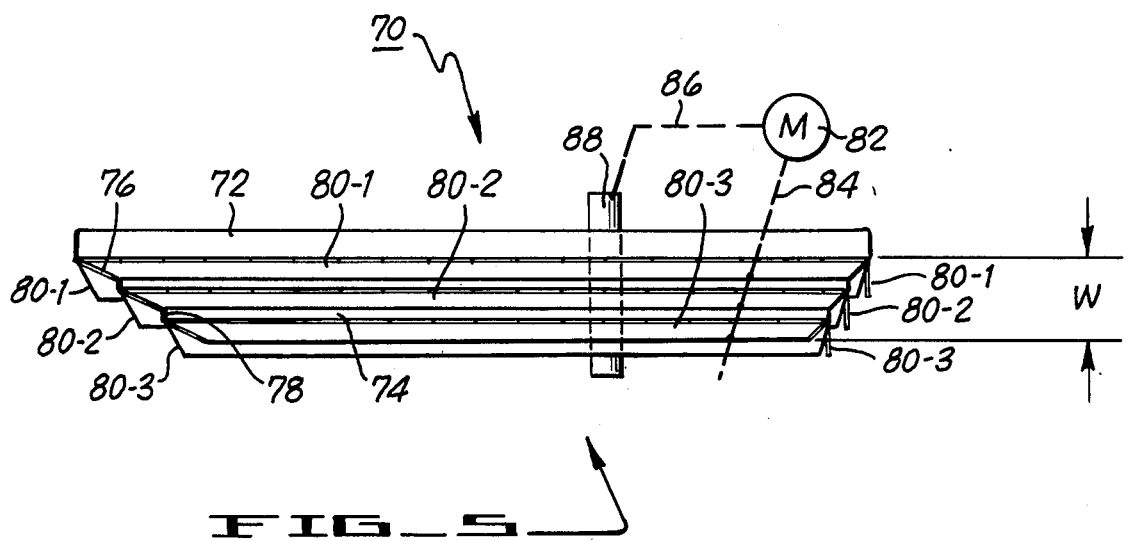
FIG_5

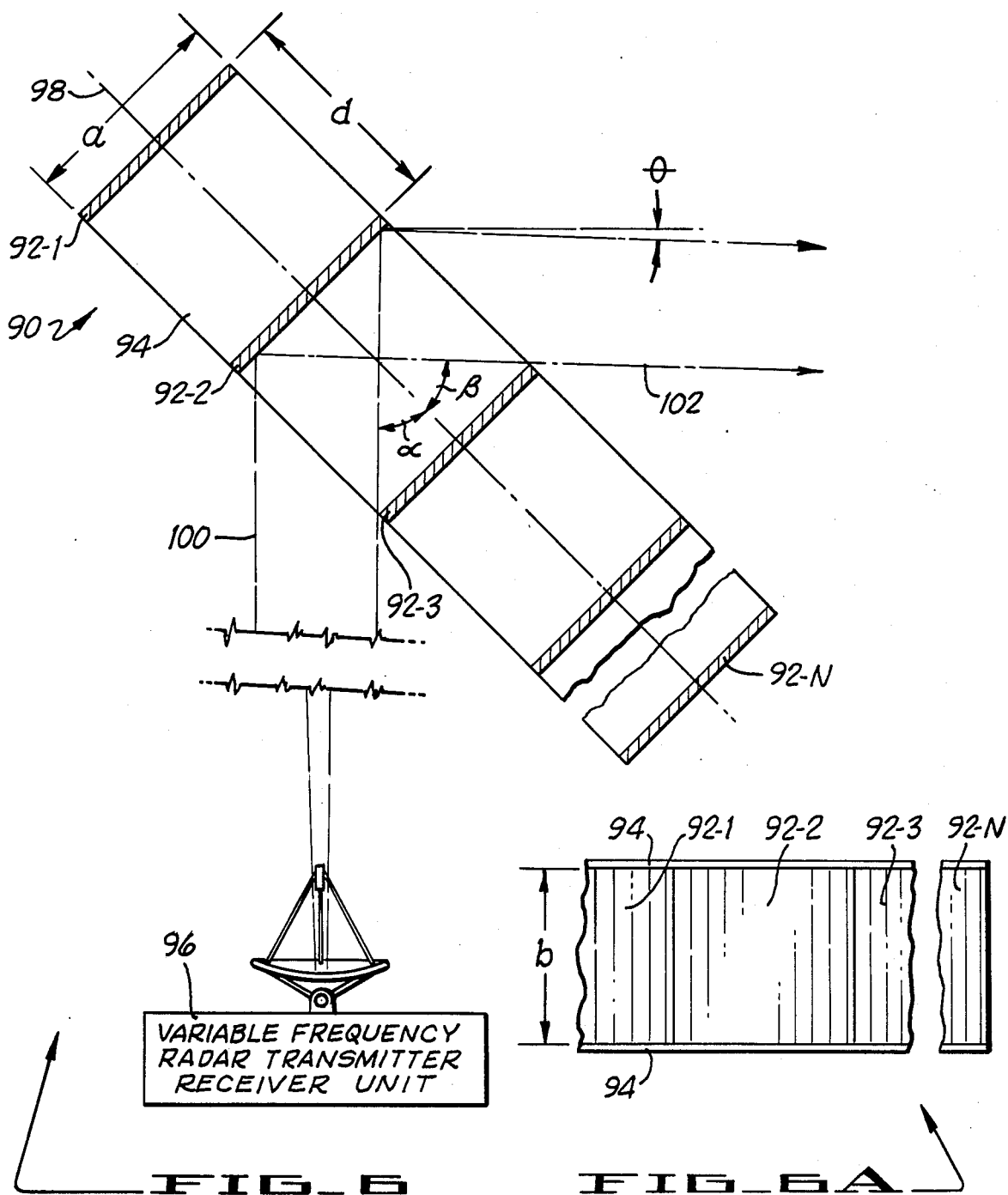
FIG_6
FIG_6A
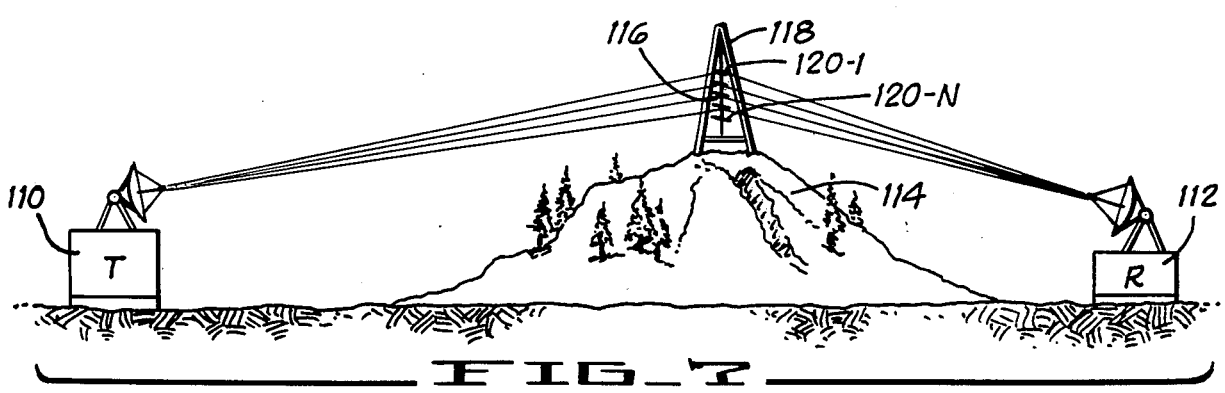
FIG_7

PASSIVE, FREQUENCY-STEERABLE, MICROWAVE REPEATER SYSTEM

ORIGIN OF THE INVENTION

This invention was made in part or in whole with United States Government support under a contract with the Defense Communications Agency. The U.S. Government has certain rights in this invention.

TECHNICAL FIELD

The present invention relates to microwave systems of the passive, frequency-steerable, repeater type, and to passive repeaters for use therein.

BACKGROUND OF THE INVENTION

As is well understood, there is a close analogy between the reflection and refraction of microwave and of optical wavefronts at boundaries between regions of different refractive index. In the optical field a structure identified as a blazed grating is known; the term "blazed" referring to the fact that the favored response is so much stronger than other responses that the grating appears to be "ablaze", i.e. on fire. Blazed optical gratings are discussed in The Optical Industry and systems Directory-Encyclopedia, Volume II, 1976, The Optical Publishing Co., Inc. Pittsfield, MA. 01202, page E37, and by Jenkins and White, Fundamentals of Optics, McGraw-Hill, 1957, pages 344–347. The design of microwave reflecting gratings employed in the communications and radar systems of the present invention is a special case of the broad class of structures referred to as blazed gratings in the optical field.

In the microwave field, some existing instruments such as frequency division multiplexers and spectrometers employ blazed gratings that function, essentially, to sort different frequencies by directing the multi-frequency input onto a blazed grating for redirection of the individual frequency components along different paths. Functionally, the operation is equivalent to that performed by a multiplechannel wave filter. In the case of the multiplexer, different frequency signals from a common input may be separated by directing the incoming beam onto a blazed grating for redirecting the same onto a multiplicity of receiving means. However, the use of blazed gratings in free space for redirecting microwave energy beams from a radar transmitter or satellite transmitter is not suggested by such microwave multiplexers and spectrometers. A microwave multiplexer employing a blazed grating is disclosed by Henry et al, "A Low-Loss Diffraction Grating Frequency Multiplexer," IEEE Transactions on Microwave Theory and Techniques, Vol. Mtt-26, No. 6, June 1978, pp. 428–433, and a microwave spectrometer is disclosed by Mallory et al, "A simple Grating System for Millimeter and Submillimeter Wavelength Separation", IEEE Transactions on Microwave Theory and Techniques, September 1963, pp. 433–434.

Passive repeaters for use in both space and on the ground are well known as shown, for example, in the following U.S. Patents: Yater, U.S. Pat. No. 3,427,623; Adams, U.S. Pat. No. 3,144,606; and Kreitzberg, U.S. Pat. No. 2,968,033. Some repeaters, such as that shown in Kreitzberg, comprise specular reflectors that are not frequency steerable. Frequency-steerable reflectors, such as those disclosed in the above-mentioned Adams and Yater patents which employ diffraction phenomena, give rise to unsuppressed diffraction lobes which may result in interference in the operation of the associated system, or other systems, and which result in power losses.

SUMMARY OF THE INVENTION AND OBJECTS

An object of this invention is the provision of a novel microwave reflection grating in which unwanted diffraction lobes are suppressed to maximize microwave energy reflected therefrom and minimize problems associated with unwanted diffraction lobes.

An object of this invention is the provision of a microwave communication or radar system that includes a blazed microwave reflection grating for passive relaying of the microwave signals.

An object of this invention is the provision of a system of the above-mentioned type wherein the blazed microwave reflection grating is frequency steerable.

The above and other objects and advantages of this invention are achieved by use of a reflection grating array comprising a plurality of plane conducting members positioned in equally spaced parallel planes and arranged in a generally stair-step configuration. The array may comprise a single sheet of metal formed with a succession of equal angle, oppositely directed, bends, with the bend angle being substantially 90 degrees, or less. Alternatively, the array may comprise a plurality of equal size parallel plane conducting members maintained in said stair-step configuration by suitable supporting means such as elongated non-conducting members at opposite edges of the array elements thereby providing a space between elements for the passage of reflected microwave energy therebetween. With a stair-step arrangement of flat plate reflector elements, there is a preferred direction of diffraction within the reradiation pattern of the individual scattering elements. Diffraction modes that are not near specular reflection from the individual elements are suppressed. Numerous radar and communications systems employing one or more microwave reflection gratings are possible including systems operating at a plurality of different frequencies for different diffraction angles of the microwave energy. Alternatively, a variable frequency system may be employed for steering of the beam.

The invention, together with the above and other objects and advantages thereof will become apparent from the following detailed description when considered with the accompanying drawings. It will be understood that the illustrated embodiments of the invention included herein are by way of example only, and the invention is not limited thereto. It is intended that other embodiments which suggest themselves to those skilled in this art shall fall within the spirit and scope of the appended claims.

BRIEF DESCRIPTION OF THE DRAWINGS

In the drawings, wherein like reference characters refer to the same parts in several views:

FIG. 1 is a pictorial representation of a microwave reflection grating embodying the present invention, together with an applicable coordinate system:

FIG. 2 is a diagrammatic side view of the reflection grating shown in FIG. 1 for use in explaining frequency steering of the return beam;

FIG. 3 shows a communication system employing the reflection grating shown in FIGS. 1 and 2 of the drawings;

FIG. 4 shows a search radar system employing a modified form of reflection grating embodying the present invention;

FIG. 5 shows another search radar system employing a triangular array of reflection gratings for sector scanning;

FIG. 5A is a top plane view of the triangular array shown in FIG. 5;

FIG. 6 shows a radar system that employs another modified form of reflection grating of a Venetian-blind type wherein individual elements of the array are spaced apart for passage of reflected energy therebetween, a vertical cross sectional view of the grating being shown in FIG. 6;

FIG. 6A is a top plane view of the grating shown in FIG. 6; and

FIG. 7 shows a ground communications system that employs a Venetian-blind reflection grating of the type shown in FIGS. 6 and 6A.

DETAILED DESCRIPTION

A simple form of microwave reflection grating embodying the present invention is shown in FIG. 1 where a grating 10 is shown comprising an array of substantially equal size plane conducting members, or elements, 12-1 through 12-N, each element 12 of the array having a length b and width a. The conducting elements, or panels, 12, are located in equally spaced parallel planes and are arranged in a generally stair-step configuration, with the elements 12 being positioned at a constant angle with respect to an envelope place 14. With the FIG. 1 arrangement, equal size "riser" members 16 interconnect adjacent elements 12 of the array. In FIG. 1 incident microwave energy identified by arrow 18 is shown. If desired, the grating may be formed from a large sheet of metal, or like conducting material, by forming a succession of alternating 90° corners to provide the illustrated stair-step structure wherein the "risers" 16 are perpendicular to the reflecting elements 12. With this arrangement of a series of right-angle scattering and connecting elements, best performance is provided when the incident wave 18 is nearly normal to the plane surface of the reflecting elements 12 and when the "riser" height, h, is nearly equal to a half wavelength of the illuminating microwave signal.

OPERATION AT NORMAL INCIDENCE

Referring to FIG. 1, consider the situation in which the incident radiation 18 is linearly polarized with the E vector in the Z direction identified in the associated coordinate system. The direction of incidence is exactly normal to the surface of each of the panels 12-1 through 12-N that make up the array, and the "riser" height h is exactly one-half wavelength. Under these circumstances the returns of the separate panels, or elements, 12 add coherently in a beam along the normal, and the result is virtually indistinguishable from the specular reflection of a planar mirror with dimensions b and Na. Thus, the effective area A of the array is given by the equation $$A = Nba \quad (1)$$

The redirection gain, corresponding to standard aperture theory, is given by $$G = 4\pi A/\lambda^2 \quad (2)$$

Under these special conditions, the effective radar cross section, $\sigma$, of the complete array is given by $$\sigma = AG = 4\pi N^2 b^2 a^2/\lambda^2 \quad (3)$$

where
$\sigma$ = monostatic radar cross section in square meters,
N = number of panels 12,
b = length of each panel in meters,
a = width of each panel in meters, and
$\lambda$ = wavelength of incident radiation in meters.

For reasons noted hereinbelow it is believed that the efficiency approaches 100% and that values of $\sigma$ resulting from Eq. (3) are likely to be realistic.

CONTRIBUTIONS OF THE INDIVIDUAL PANELS

Before proceeding it is appropriate to examine the way in which the individual panels contribute to the total response. Again, considering only normal incidence, and directing attention to one particular panel it is noted that the power, $P_1$, incident on this panel 12 is given by the equation $$P_1 = abD \quad (4)$$

where a and b are the dimensions indicated, and D, the incident power density in watts per square meters, is given by $$D = E \times H = E^2/377 \quad (5)$$

where E is the field strength of the incident wave in volts/meter, and H is the corresponding magnetic field strength.

The redirection Gain, $G_1$, of a single panel 12 operating at wavelength $\lambda$ is given by the equation $$G_1 = 4\pi ab/\lambda^2 \quad (6)$$

Here, as in Eq. (3), it is assumed that the efficiency is 100%.

The 3-dB beamwidths for each panel are given by the following equations:

$$\phi = (0.886\lambda/a) \text{ radians in the yz plane} \quad (7)$$

$$\theta = (0.886\lambda/b) \text{ radians in the xy plane} \quad (8)$$

The angle that can be scanned by an array of such panels is limited by the 3-dB beamwidth in the yz ($\phi$) plane of each panel, which, as shown by Eq. (7), is controlled by the width dimension, a.

BANDWIDTH LIMITATION

As with one-dimensional configurations, such as the string of resonant spheres, the overall bandwidth is limited by the array dimension along the direction of the incident radiation. In the present case, the overall depth of an N-step array s $N\lambda/2$, and the round-trip path length is simply $N\lambda$. Therefore the total time delay is given by the equation $$\tau = N\lambda/c \quad (9)$$

The 3-dB bandwidth is given by the equation $$\Delta f = 0.866 c/N \quad (10)$$

where c is the speed of light.

FREQUENCY STEERING

As noted above, for one particular frequency the return from the grating array is equivalent to that from a specular reflector. It now will be shown that the beam can be steered—in the $\phi$ direction only—by varying the frequency and hence the wavelength of the incident radiation. The analysis is facilitated by adopting the notation shown in FIG. 2, wherein a normal 20 to the envelope plane 14, incident beam 22, diffracted return beam 24, equiphase surface 26 for the incident wave, and equiphase surface 28 for the refracted return wave, are shown.

The governing equation, which closely resembles one that applies to a linear array of resonant spheres, is $$\sin \alpha + \sin \beta = n\lambda/g \tag{11}$$

where n is an integer and $$g = \sqrt{a^2 + h^2} \tag{12}$$

The correctness of Eq. (11) for the special case of normal incidence and return that was discussed above is readily verified by letting $$\lambda = 2h \tag{13}$$

and $$\alpha = \beta = \Psi \tag{14}$$

which reduces Eq. (11) to the form $$2 \sin \Psi = n2h/g \tag{15}$$

Specular reflection occurs when n=0, in Eq. (11), and therefore $$\alpha = -\beta \tag{16}$$

The first-order case, which is of principal interest in the present situation occurs for n=1.

It should be noted that, if the dimensions are properly chosen, the return angles that correspond to n=0, n=2, n=3, etc. may be forced to lie far outside the main beam of each individual panel or to become imaginary. Therefore very little energy is lost in these responses.

To obtain the rate of frequency steering Eq. (11) is differentiated. Holding the angle of incidence constant, then, $$\cos \beta d\beta = \eta d\lambda/g \tag{17}$$

Solving for $d\beta$ in the desired case where n=1 yields $$d\beta = \frac{1}{g \cos \beta} d\lambda \tag{18}$$

Situations of primary interest are those wherein $\alpha$ and $\beta$ are both nearly equal to $\Psi$. For this case the denominator of Eq. (18) is nearly equal to a, and therefore, $$d\beta = \frac{\lambda}{a} \frac{d\lambda}{\lambda} = -\frac{\lambda}{a} \frac{df}{f} \text{ radians} \tag{19}$$

In terms of FIG. 1 the foregoing discussion is limited to the case in which $\theta = 0$. The response for other values of $\theta$ follows the familiar laws of specular reflection, and the angles of incidence and reflection are equal. If the source moves in one direction, the receiver must move an equal amount in the opposite direction. If the array is rotated by some angle $\theta$, the exit beam rotates through the double angle $2\theta$. This familiar effect is useful in a spinning array used for mechanical scanning in a search radar system.

MULTIPLE ARRAYS

The arrays discussed so far are capable of scanning in one dimension. However, in many situations the gain and bandwidth parameters available from a single array are inadequate to provide sufficient geometrical coverage. The situation can be alleviated by grouping two or more similar arrays displaced from one another by appropriate angles of rotation in such a way as to provide additional coverage. The total amount of energy intercepted increases in proportion to the total area of the composite array, and this additional energy may be returned to the earth, in the case of a satellite repeater, as required to increase the coverage. This concept is discussed further hereinbelow.

EDGE EFFECTS AND EFFICIENCY

At this point it is appropriate to examine in some detail how edge effects may affect the efficiency of the reflection grating array. Because the width, a, of each plane surface is likely to be only a few wavelengths, one might fear that the return would be seriously reduced by nonuniformity of current flow associated with edge effects. This fear is largely ungrounded. To prove this assertion consider the special situation of normal incidence in which the incident wave is linearly polarized, with the E vector in the Z direction. Examining any particular reflecting element 12, it is seen that the element carries surface currents that provide the required continuity of the electric and magnetic fields. By iterating this argument it is seen that all continuity relations for the entire array are satisfied and that the (internal) edge effects are identically zero under the particular conditions selected for this example. Thus under these special conditions the efficiency of the grating should be equal to that of a corresponding flat mirror. Because a large flat mirror is very efficient, it is concluded that the grating is also very efficient.

Boundary conditions that exist for normal incidence when the plane of polarization is rotated by 90° are less easy to visualize. However, all current flow must occur in the X direction, and ohmic losses must be low. These considerations, and inferences drawn from general array theory, suggest that the efficiency should remain high.

The situation becomes even more complicated for general angles of incidence. However, no reason for a serious loss of efficiency is foreseen.

PASSIVE SATELLITE COMMUNICATION SYSTEM

As noted above, a novel use of the microwave reflection grating 10 of this invention is that of a passive satellite repeater in a communications system, such as shown in FIG. 3. There, an orbiting passive repeater 30 comprising an X-band ($\lambda \dot{=} 3$ cm) diffraction grating 10 is shown, together with ground transmitting station 34, and two receiving stations 36 and 38 at opposite sides of the transmitting station. Area 40 represents the first order diffraction mode from the grating 10 with frequency steering, and shaded areas 42 and 44 within area 40 represent those first order diffraction modes established at first and second transmitter frequencies.

To aid in interpreting equations developed above, assume that the X-band array 10 is at synchronous altitude for serving that portion of the Northern Hemisphere that is visible from the array, which is approximately 1/6 of the earth's surface. The Z axis of FIGS. 1 and 3 is the velocity vector of the array, parallel to the equator, and the Y-axis points approximately half way between the earth's center and the north pole. Techniques for deploying and stabilizing structures of this type in space are well known and require no detailed description. Structures including other passive repeaters having dimensions, complexity and tolerance requirements comparable to those of the present array have been successfully deployed and stabilized by a number of different organizations.

The transmitter 34 is located on the Y-axis, and can serve the entire northern hemisphere if the beamwidth $\theta$ in Eq. (8) is approximately 7° and if the beam is steerable in the east-west direction by $\pm 7°$. To accomodate all possible combinations of stations in the northern hemisphere, both of these angles must be doubled.

For total beamwidth of 14°, i.e. about $\frac{1}{4}$ radian, Eq. (8) is used to obtain $$b \approx 3.6\lambda \approx 11 \text{ cm} \qquad (20)$$

The angles to be covered in the east-west direction are twice as large. Substition of $\frac{1}{2}$ radian in Eq. (7) yields $$a = 1.8\lambda \approx 5.5 \text{ cm} \qquad (2)$$

The height dimension h is simply $$h = \lambda/2 = 1.5 \text{ cm} \qquad (22)$$

To serve two stations that are both near the eastern (or western) limit of the coverage zone the beam must be retrosteered about 14° from the condition of specular reflection. Substitution of $\phi = \pm 14°$ in Eq. (19) yields $$\lambda = 3 \pm 5.5 \times 0.24 = 1.7 \text{ cm or } 4.3 \text{ cm} \qquad (23)$$

The corresponding frequencies are 7.0 and 17.6 GHz. It is interesting to note that frequency allocations could be made on the basis of longitude. Depending on the sense of the array, the eastern stations would need only lower (or higher) frequencies while the converse would be true for western stations.

The limiting bandwidth is related to the number N of panels 12 (and hence the radar cross section of the array) by Eq. (10). If we select $\Delta f = 10$ MHz, and $\lambda = 3$ cm, then $$N = 880 \qquad (24)$$

The overall dimensions of the total array become $0.11 \times 48.5$ meters. At 10 GHz the resulting radar cross section is $$\sigma = 4\pi(0.11)^2(48.5)^2/(0.03)^2 = 4 \times 10^5 \text{ or } +56 \text{ dBm}^2 \qquad (25)$$

This cross section is nearly equal to that of a linear array of 80,000 resonant spheres, for which the bandwidth limit is only about 0.1 MHz.

The large frequency range implicit in Eq. (23) is inconvenient and causes the cross section to vary between limits $+51$ and $+63$ dBm$^2$. The variation could be improved if two or more arrays were used. For example, one array might be assigned to the eastern half and the other to the western half of the northern hemisphere. This would cut the frequency variation in half. Alternatively, if wide-range tuning was acceptable, one array might serve the north tropic zone and another the north temperate zone. The length, b, of each panel could now be doubled and the radar cross section of each array would be quadrupled, ($+6$ dB), as would the total area of the pair of arrays. The bandwidth of each array still would be approximately 10 MHz. It will be apparent that the transmitter station 34 either may comprise a variable frequency transmitter for communicating with either receiver station 36 or 38, or may comprise a multichannel transmitter for simultaneous transmission at a plurality of different frequencies (here two frequencies) for simultaneous communication with both receiver stations 36 and 38.

RADAR APPLICATION

A large grating of the present type may be used in a search radar system. One arrangement is illustrated in FIGS. 4 and 4A which show a grating 50 inclined at an angle of 45° with respect to an earth radius. The grating 50 is similar to grating 10 shown in FIGS. 1-3 and described above, and includes a plurality of conducting reflecting panels 52-1 through 52-N connected by connecting members 54. As with the arrangement of FIGS. 1-3, the grating may be formed of a single sheet of metal, or like conducting material bent into the illustrated stair-step configuration. Now, however, 45° bends are provided between the panels 52 and adjacent "risers" or connecting members 54, rather than the 90° bends of the FIGS. 1-3 arrangement.

A monostatic variable-frequency radar transmitter/receiver unit 56 is located directly beneath the grating 50 such that microwave energy propagated vertically from the radar 56 to the array 50 is redirected into a substantially horizontal beam 58. If desired, the array 50 may be adapted for rotation about a vertical axis to provide azimuth scanning. Elevation scanning is produced by frequency steering by varying the output frequency of the radar transmitter. In this application it is desirable to limit the azimuthal beamwidth to a small value such as 0.1°. Therefore, the array can have a horizontal dimension, b, that is relatively large; e.g. 500$\lambda$.

Referring to FIG. 4, consider the special case in which h, the step between adjacent reflecting panels 52, is equal to the wavelength, $\lambda$, of the illuminating microwave beam, the incident beam is exactly vertical, and the panels 52 are inclined at an angle of 45° with respect to the vertical.

Under these circumstances the specular reflections from the individual panels 52 add coherently and the exit beam 58 is directed horizontally to the left. The capture area of an array of N panels 52 is given by $$A_1 = 0.707 \text{ Nba} \qquad (26)$$

The step dimension h does not enter this equation because of the special geometry chosen.

Here, as above, we are interested in the first-order grating response. And, as before, the directivity of each individual panel is made so large that no appreciable amount of power is lost in other lobes. Moreover, as above, the boundary conditions are simplified if it is assumed that the incident radiation is linearly polarized with E in the plane of the drawing. The exit beam is generated by an area larger than that described by Eq. (26). It is given by $$A_2 = (h + 0.707a)Nb \tag{27}$$

Consequently, the directivity of the horizontal (exit) beam is greater than that of the vertical (incident) beam.

An echo from a radar target is received in the horizontally directed beam, so the echo signal strikes the lower surface. The inclined panels operate as before and generate a coherent vertical beam with a directivity given by Eq. (26). The panels 52 tend to form a horizontal beam by specular reflection. However, the formation of any resulting beam is dominated by the requirement for overall coherence. In the special case described by $$n\lambda = \sqrt{2a} \tag{28}$$

the coherence requirement is met by a horizontal beam, and the energy striking the vertical panels, or risers, 54 will be expended in two or more lobes governed by Eq. (11). If the risers are not conducting, less energy will be reflected.

NUMERICAL EXAMPLE FOR A RADAR APPLICATION

Suppose that the array 50 shown in FIGS. 4 and 4A is suspended at an altitude of approximately 70,000 feet, directly above a powerful X-band radar 56 whoe antenna is pointed straight up. Suppose further that the array 50 is rotated about the vertical axis by means not shown, to produce azimuth scanning, and that elevation scanning is provided by frequency steering. Such a system is potentially capable of providing radar surveillance down to ground level and extending out to a range of approximately 300 (statute) miles. For this particular geometry the angle-doubling in connectiion with specular reflection of the type shown in the FIGS. 1–3 arrangement does not occur, and the azimuth scan corresponds degree for degree with the rotation of the array.

RADAR WITH AZIMUTH SECTOR SCANNING

In situations where it is desirable to scan only a limited sector of azimuth, the single array may be replaced by two or more arrays grouped in some symmetrical manner. For example, a triangular group of three arrays will produce three beams separated by 120° in azimuth. Undesirable interference from two of the beams can be avoided by disabling them on a sequential basis. Direct masking is one method for achieving this goal. However, mechanical modulation of the array, e.g. rotating the individual panels as in a window shutter is an alternative.

A radar system that includes a triangular array 70 to produce a 120° sector scan is shown in schematic form in FIGS. 5 and 5A. There, the array 70 is shown to include an equilateral triangular shaped body 72 having sidewalls 74 that are contoured in the manner of the inclined grating shown in FIGS. 4 and 4A and described above. That is, the walls include portions 76 inclined at 45° relative to vertical, and interconnecting vertical portions 78. Conducting reflecting panels 80-1, 80-2 and 80-3 are pivotally attached to the sidewalls of the body 72, which panels are movable between operative and inoperative positions. In the operative position, the panels are positioned flat against the inclined portions 76 of the body, and in the inoperative position, they extend vertically downwardly. A motor 82 connected through mechanical linkage 84 controls the position of the panels. The motor 82 also connects through mechanical linkage 86 to an axle 88 affixed to the body 72 for rotating the array at a substantially constant rotational speed about the axis of axle 88.

During a predetermined 120° portion of the rotating array, one set of panels is in operative position, while the other two sets of panels are in the inoperative position thereby producing a 120° sector scan of the azimuth. The azimuthal beamwidth $\theta$ from Eq. (8) is 0.00144 radians or 0.082 degrees if the dimension $b = 610\lambda$ (with $\lambda = 3$ cm) or about 60 feet. The vertical beamwidth from the same equation is 0.82 degrees if the dimension W=6 feet.

For this radar application, elevation scanning from, say, $-2°$ to $-30°$ [, i.e. $-16° \pm 14°$] is appropriate. Therefore, results previously developed for the above-described communications satellite may be applied here. The pitch distance g (FIG. 4) may be 5.5 cm, and the wavelength must be varied from 1.7 to 4.3 cm. The rate of frequency steering can be derived from Eq. (19). About 30 reflecting panels 80 are required to occupy 6 feet of vertical aperture, W.

BLAZED MICROWAVE REFLECTION GRATING IN FORM OF VENETIAN BLIND FOR USE IN A SCANNING MICROWAVE RADAR

Reference now is made to FIGS. 6 and 6A of the drawings wherein another search radar system which is similar to that shown in FIGS. 4 and 4A and described above is shown. In the system of FIGS. 6 and 6A, a modified form of blazed microwave reflection grating 90 is shown comprising a plurality of conducting reflecting panels, or elements, 92-1 through 92-N. The elements 92 of the array are of equal size, each being a wide and b long. They are located in parallel spaced planes at a uniform distance d apart. Side connecting members 94,94 at opposite ends of the panels 92 support the panels in the illustrated spaced positions; the connecting members being formed of either electrically conducting or non-conducting material. It will be seen, then, that the grating 90 takes the form of a Venetian blind with the array elements equally spaced.

The use of parallel, spaced, flat plates for scattering elements makes this configuration a blazed grating which has the property that there is a preferred direction of diffraction, namely, within the reradiation pattern of the individual scattering elements 92. In this case diffraction modes that are near specular reflection from the individual plates 92 will be suppressed.

In the radar application illustrated in FIG. 6, the grating is located at a high altitude and is tilted at an angle $\alpha$ of 40° with respect to vertical. A variable frequency radar transmitter/receiver unit 96 is located directly beneath the grating, which radar includes an antenna pointed vertically upwardly for illumination of the grating. Line 98 is a normal through the reflecting panels 92 whereby angle $\alpha$ is the angle of incidence of the beam 100 from the radar, and angle $\beta$ is the exit angle of reflected beam 102. The radar wave vertically incident from below is diffracted according to the following equation.

$$d \cos \alpha + d \cos \beta = n\lambda \quad (29)$$

where n is an integer and λ is the wavelength.

For purposes of illustration, assume that the radar is operating at a frequency of 10 GHz (i.e. $\lambda = 3$ cm) and that $d = 9.79$ cm. With the arrangement of FIGS. 6 and 6A, a 10 GHz signal gives rise to a 5th order diffraction mode at an angle $\beta = 40°$ or $\theta = (\beta - 50°) = -10°$, where $\theta$ is the angle of the emerging beam with respect to horizontal. The 4th order diffraction mode emerges at $\beta = 62.6°$ ($\theta = +12.6°$) which is 22.6° away from specular and is thereby suppressed. Lower order diffraction lobes are located even further from specular. No high order lobes exist for this example; this can be verified by noting that solutions of Eq. (29) for higher order moes can be obtained only for imaginary values of $\beta$.

For the chosen configuration, note that the incoming beam illuminates the entire lower surface of each diffraction plate. Similarly, the emerging beam is not shaded by other plates if $\theta$ remains in the range between horizontal and $-10°$ which corresponds to the critical long-range portion of radar coverage from an elevated platform.

The effectiveness of suppression of unwanted diffraction modes is governed by the effective aperture of the individual scatterers. For the example of FIGS. 6 and 6A the effective aperture is (a cos $\beta$)=6.28 cm and the 3-dB beamwidth (in elevation) of a single scatterer is $(51\lambda/\text{aperture}) = 24.4°$. This implies that the 3-dB points are at $+12.2°$ and the first nulls are at $\pm 27.5°$ with respect to the center of the beam.

The actual beamwidth in elevation of the departing beam is controlled by the total aperture of the grating array and hence will be much smaller than for the individual scatterers. For example, a 0.5° beamwidth requires a total aperture of $102\lambda = 3$ m which, in turn, implies a total length of L=(total aperture)/sin $\beta = 4.8$ m (i.e., 49 scattering plates oriented as shown in FIGS. 6 and 6A).

Similarly, the azimuthal beamwidth is controlled by the length of the diffraction plates and can be chosen at will.

In order to scan the beam (in elevation) from $-10°$ up to $-2°$ with respect to horizontal the frequency must be increased from 10 to 10.7 GHz. Similarly, to scan the beam down to $-26°$ requires decreasing the frequency to 9.1 GHz. Thus for this particular example a 16% frequency change is sufficient to sweep from $\theta = -16°$ to $\theta = -2°$.

As noted above, the advantage of using a blazed grating is that unwanted diffraction lobes are suppressed. This is important both for minimizing the required transmitter power and for avoiding false radar returns.

GROUND COMMUNICATION LINK

Another example for use of a blazed microwave reflection grating of the Venetian-blind type shown in FIGS. 6 and 6A is shown in FIG. 7 to which Figure reference now is made. there, a ground communication link comprising a transmitting station 110 and associated receiving station 112 is shown which stations are separated by a natural barrier, in this case a mountain range 114. In accordance with this embodiment of the invention, a passive grating 116 is located atop the mountain for redirecting energy from the transmitter to the receiver. The array is suspended from a tower 118, and includes a plurality of spaced reflecting elements 120-1 through 120-N. A highly directive array is provided by operation at a frequency at which one order of diffraction mode produces an exit beam which emerges from the array close to specular reflection.

The invention having been described in detail in accordance with requirements of the Patent Statutes, various other changes and modifications will suggest themselves to those skilled in this art which are intended to fall within the spirit and scope of the invention as defined in the appended Claims.

We claim:

1. A microwave communications system for transmitting information from a transmitting station to a receiving station that may be out of line-of-sight of each other, the system comprising
   a microwave reflection grating that is within line-of-sight of said transmitting station and said receiving station, said microwave reflection grating comprising a unitary sheet of conducting material formed with a succession of alternating equal-angle bends to form a substantially stair-step structure, said stair-step structure including a plurality of electrical conducting scattering elements having plane parallel surfaces that face in the same direction,
   means for positioning the scattering elements with the plane parallel surfaces thereof in parallel substantially equally spaces planes, and
   means for beaming microwave information-bearing energy from said transmitting station onto the plane parallel surfaces of the scattering elements of the grating from which surfaces energy is reradiated, the frequency and incident angle of the incident microwave beam on the surfaces providing for energy exit from the grating in the direction of said receiving station at a diffraction-mode angle within the reradiation pattern of the individual scattering elements of the grating, said microwave transmitting station comprising a variable frequency transmitter for beam steering of energy exiting from said grating.

2. A microwave communications system as defined in claim 1, a microwave reflection grating wherein said plane parallel surfaces are of equal width and of substantially equal length.

3. A microwave communications system as defined in claim 1, a microwave reflection grating wherein said positioning means comprise connecting members between adjacent scattering elements, said connecting members including plane parallel surfaces located in equally spaced parallel planes and extending between said plane parallel surfaces of said scattering elements.

4. A microwave communications system as defined in claim 3, a microwave reflection grating wherein the plane parallel surfaces of the connecting members extend parallel to the incident microwave energy beam from said transmitting station.

5. A microwave communications system as defined in claim 1, a unitary microwave reflection grating wherein the equal angle bends are no greater than substantially 90°.

6. A microwave communications system for transmitting information from a transmitting station to a receiving station that may be out of line-of-sight of each other, the system comprising
   a microwave reflection grating that is within line-of-sight of said transmitting station and said receiving station, said microwave reflection grating comprising a plurality of electrical conducting scattering elements comprising plane substantially equal size panels having plane parallel surfaces that face in the same direction, means for positioning the scattering elements with the plane parallel surfaces thereof in parallel substantially equally spaces planes, and means for beaming microwave information bearing energy from said transmitting station onto the plane parallel surfaces of the scattering elements of the grating from which surfaces energy is reradiated, the frequency and incident angle of the incident microwave beam on the surfaces providing for energy exit from the grating in the direction of said receiving station at a diffraction-mode angle within the reradiation pattern of the individual scattering elements of the grating, said microwave transmitting station comprising a variable frequency transmitter for beam steering of energy exiting from said grating, said positioning means comprise connecting members at opposite ends of the panels for support thereof at spaced-apart positions, such that microwave energy beamed onto the grating from the transmitting station passes between adjacent panels of the grating in traveling to said receiving station.

7. A microwave communications system as defined in claim 1 wherein said microwave reflection grating is located in synchronous orbit around the earth.

8. A microwave communications system for transmitting information from a transmitting station to first and second receiving stations at different locations on the earth which receiving stations may be out of line-of-sight of the transmitting station, the system comprising a microwave reflection grating that is within line-of-sight of said transmitting station and said first and second receiving stations, said microwave reflection grating comprising a unitary sheet of conducting material formed with a succession of alternating equal-angle bends to form a substantially stair-step structure, said stair-step structure including a plurality of electrical conducting scattering elements having plane parallel surfaces that face in the same direction that means for positioning the scattering elements with the plane parallel surfaces thereof in parallel substantially equally spaced planes and means for simultaneously beaming microwave information-bearing energy at first and second frequencies from said transmitting station onto the plane parallel surfaces of the scattering elements of the grating from which surfaces energy is reradiated, energy of said first and second frequencies exiting said reflection grating at first and second angles in the directions of said respective first and second receiving stations for communications between said transmitting station and said first and second receiving stations, the first and second frequencies and incident angle of the incident microwave energy beam on the surfaces providing for energy exit from the grating in the direction of said first and second receiving stations, respectively, at diffraction angles within the reradiation pattern of the individual scattering elements of the grating.

9. A beam-steering radar system, the combination comprising a variable frequency radar transmitter, a receiver and means for beaming microwave energy in a predetermined direction, reflector means comprising a blazed microwave reflection grating in the path of the energy beam for redirecting said beam, said blazed microwave reflection grating being located at an elevated position above the earth's surface, and said means for beaming microwave energy being positioned directly beneath said grating, means for varying the operating frequency of said transmitter for beam steering of energy exiting from said reflector means, the transmitted beam being scanned in elevation with variations in the transmitted frequency, and means for rotating said reflector means about a substantially vertical axis for azimuth scanning of the beam.

10. A beam-steering radar system, the combination comprising a variable frequency radar transmitter, a receiver and means for beaming microwave energy in a predetermined direction, reflector means located at an elevated position above the earth's surface in the path of the energy beam for redirecting said beam, said means for beaming microwave energy being positioned directly beneath said reflector means, means for varying the operating frequency of said transmitter for beam steering of energy exiting said reflector means, the transmitted beam being scanned in elevation with variations in the transmitted frequency, means for rotating said reflector means about a substantially vertical axis for azimuth scanning of the beam, said reflector means comprising a plurality of blazed microwave reflection gratings with different azimuthal orientations, and means for sequentially enabling and disabling operation of said gratings during rotation of said reflector means for azimuthal sector scan control of the beam.

11. A beam-steering radar system as defined in claim 10 wherein said reflector means comprises three blazed microwave reflection gratings that are sequentially enabled for azimuthal sector scanning through an arc of substantially 120 degrees.

12. A beam-steering raday system, the combination comprising a variable frequency radar transmitter, a receiver and means for beaming microwave energy in a predetermined direction, reflector means comprising a blazed microwave reflection grating in the path of the energy beam for redirecting said beam, said blazed microwave reflection grating comprising a unitary sheet of conducting material formed with a succession of alternating equal-angle bends to form a substantially stair-step construction, said stair-step grating including a plurality of electrical conducting scattering elements having plane parallel surfaces that face in the same direction and means for positioning said scattering elements with the plane parallel surfaces thereof in parallel substantially equal spaced planes, said positioning means including connecting members between adjacent scattering elements, which connecting members include plane parallel surfaces located in equally spaced parallel planes and extending between said plane parallel surfaces of said scattering elements, the plane parallel surfaces of said connecting members extending substantially parallel to the microwave energy beam from said means for beaming microwave energy in a predetermined direction, and means for varying the operation frequency of said transmitter for beam steering of energy exiting from said reflector means.

13. A beam-steering radar system, the combination comprising a variable frequency radar transmitter, a receiver and means for beaming microwave energy in a predetermined direction, reflector means comprising a blazed microwave reflection grating in the path of the energy beam for redirecting said beam, and means for varying the operating frequency of said transmitter for beam steering of energy exiting from said reflector means, said blazed microwave reflection grating comprising a plurality of electrical conducting scattering elements comprising plane, substantially equal-size panels that are suppoted at equal spaced-apart positions in a Venetian-blind type structure so that they redirect microwave energy beamed onto said blazed grating such that microwave energy passes between adjacent panels of the grating.

14. A blazed microwave reflection grating for redirecting microwave energy directed thereon from a communication transmitter, a radar transmitter or the like comprising, a plurality of electrical scattering elements comprising a plurality of plane conducting panels of substantially equal size, and means for supporting said panels at equal spaced-apart positions in a Venetian-blind type structure, incident microwave energy directed onto said scattering elements from the transmitter being redirected between adjacent panels of the grating.

15. A microwave communications system employing a passive repeater, a transmitting station, and a receiving station, which transmitting and receiving stations are remotely located from the passive repeater, means for beaming microwave information-bearing energy from said transmitting station onto said passive repeater from which passive repeater energy is reradiated in the direction of said receiving station, means at the receiving station for receiving energy from said passive repeater, said passive repeater comprising a blazed microwave reflection grating that includes a plurality of electrical conducting scattering elements having plane parallel surfaces that face in the same direction, the frequency of the microwave information-bearing energy beam from the transmitting station and the incident angle thereof on the plane parallel surfaces of the blazed microwave reflection grating providing for energy exit from the passive repeater in the direction of the receiving station at a diffraction-mode angle within the reradiation pattern of the individual scattering elements of the grating.

* * * * *